May 27, 1924.

C. F. EHRENTRAUT

OUTAGE GAUGE

Filed Aug. 1, 1922

INVENTOR
Charles F. Ehrentraut
by C. M. Clark
Attorney

May 27, 1924.

C. F. EHRENTRAUT

OUTAGE GAUGE

Filed Aug. 1, 1922

INVENTOR.
Charles F. Ehrentraut
by O. M. Clarke
Attorney

May 27, 1924.

C. F. EHRENTRAUT

OUTAGE GAUGE

Filed Aug. 1, 1922     4 Sheets-Sheet 3

INVENTOR.
Charles F. Ehrentraut
by C. M. Clarke
Attorney

Patented May 27, 1924.

1,495,581

UNITED STATES PATENT OFFICE.

CHARLES F. EHRENTRAUT, OF PITTSBURGH, PENNSYLVANIA.

OUTAGE GAUGE.

Application filed August 1, 1922. Serial No. 578,905.

*To all whom it may concern:*

Be it known that I, CHARLES F. EHRENTRAUT, a citizen of the United States, residing at Pittsburgh, in the county of Allegheny and State of Pennsylvania, have invented certain new and useful Improvements in Outage Gauges, of which the following is a specification.

This invention is for an outage gauge, and is for an improvement over the constructions shown in my Patents No. 1,275,409, dated August 13, 1918 and No. 1,417,892 dated May 30, 1922.

As explained in my patents above referred to, gauges of this kind are used in the handling of liquids, and particularly in shipping crude oil or liquid hydrocarbons in tanks and tank cars, and are for the purpose of providing the consignor with a means for checking the report of the consignee as to the amount, quality and temperature of the contents of a tank at the time it is opened by the consignee. The importance of a practical instrument for this purpose may be appreciated if it is understood that, due to several factors, such as leakage, temperature changes, and evaporation, certain changes in the volume, and specific gravity of the contents of the tank take place between the time when the car is filled and sealed and when it is opened, and that, due to standing, different contents will segregate and settle to the bottom of the car.

The usual practice is for the consignor to accept such report as the consignee may make upon the car being received, and accept payment in accordance with the findings made in such report.

The present invention proposes to provide an outage gauge of compact structure, which will automatically lock when the dome cap of the car is removed for removing the contents of the car, and which will record the depth of the contents when the car is opened, the temperature, and take a sample from the bottom of the car and another at a point above the bottom. When once locked, an unauthorized person may not, without breaking the gauge, change its reading, alter the temperature reading, or remove or substitute the samples. Thus, upon the car being returned to the shipper, he can check upon the report made by the consignee and be in a position to verify such reports.

My invention may be understood by reference to the accompanying drawings, in which.

Figures 1, 2, 3, 4:
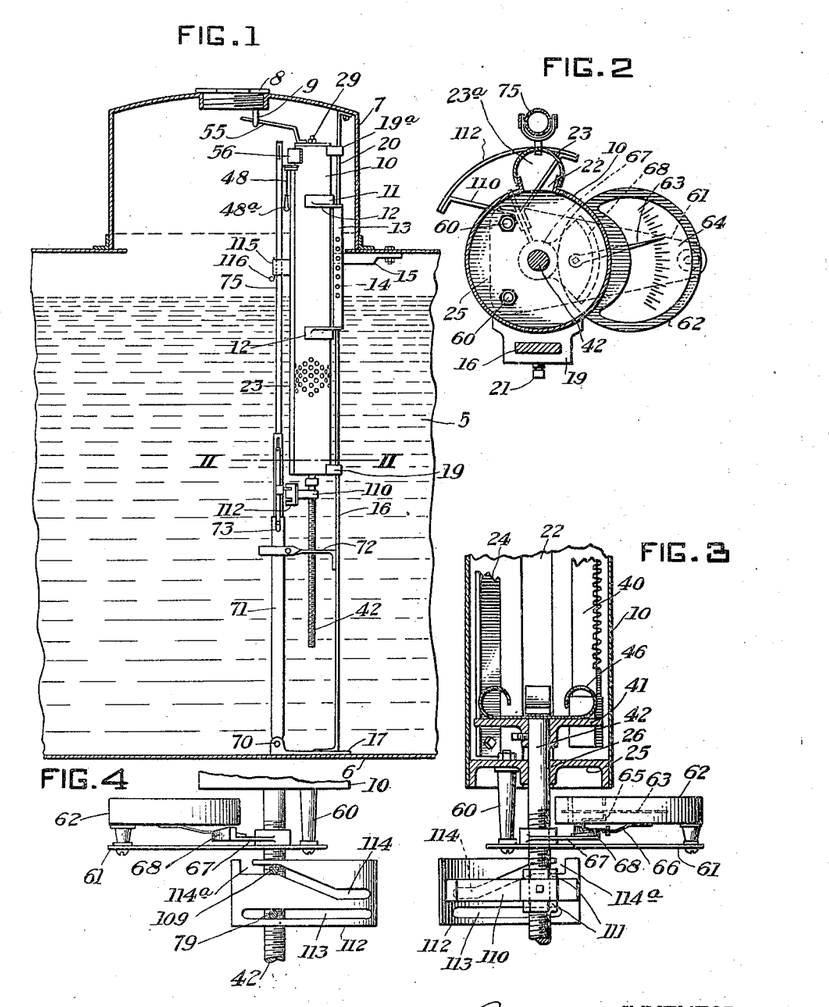
Fig. 1 represents a longitudinal vertical section through a tank car, showing a side elevation of the gauge installed therein.
Fig. 2 is a section on line II—II of Fig. 1.
Fig. 3 is a vertical section through the lower part of the gauge.
Fig. 4 shows a front view of part of the mechanism shown in Fig. 3.
Figure 5:
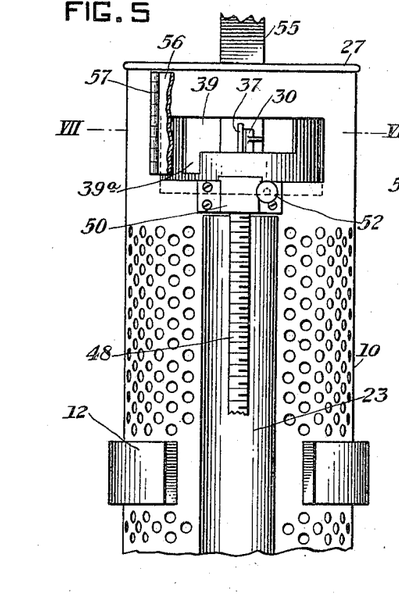
Fig. 5 is an elevation of the top part of the gauge.
Figure 6:
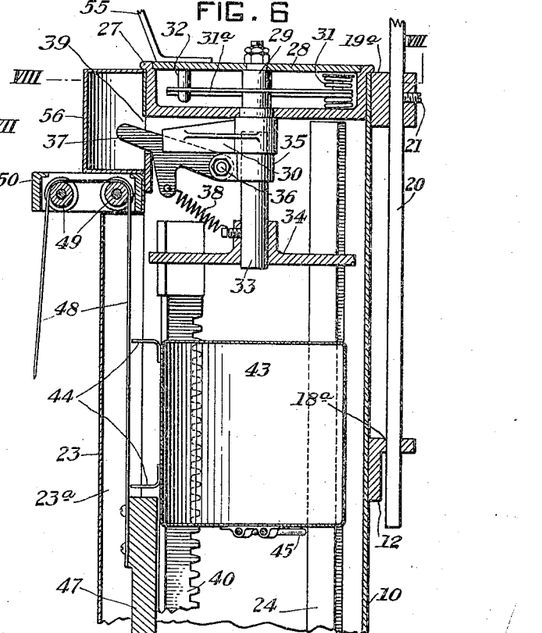
Fig. 6 is a vertical section through the part of the gauge shown in Fig. 5.
Figure 7:
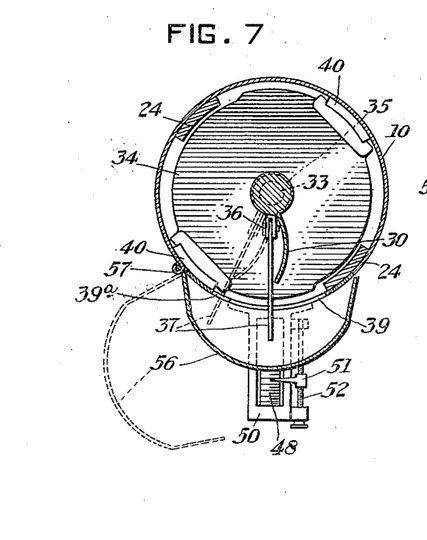
Fig. 7 is a transverse section on line VII—VII of Fig. 5.

In the drawings, 5 designates a shipping tank, such as the tank of a tank car, having a bottom 6 and a dome 7. In the dome 7 is an opening arranged to be closed by cap 8 which screws into said opening. On the inner face of the cap is an eccentric pin 9.

The gauge includes a float retaining housing 10 in the form of a cylinder, the housing preferably being made of closely perforated sheet metal. It is adjustably supported in the tank by means of a bracing structure 11 having semi-circular arms 12 that embrace the cylinder and are secured thereto. These arms are connected by vertical strips 13 having holes 14 therein. Inside the tank, is a fixed bracket 15. A bolt passing through the holes 14 and through an opening in bracket 15 provide the main support for the cylinder.

Figure 9:
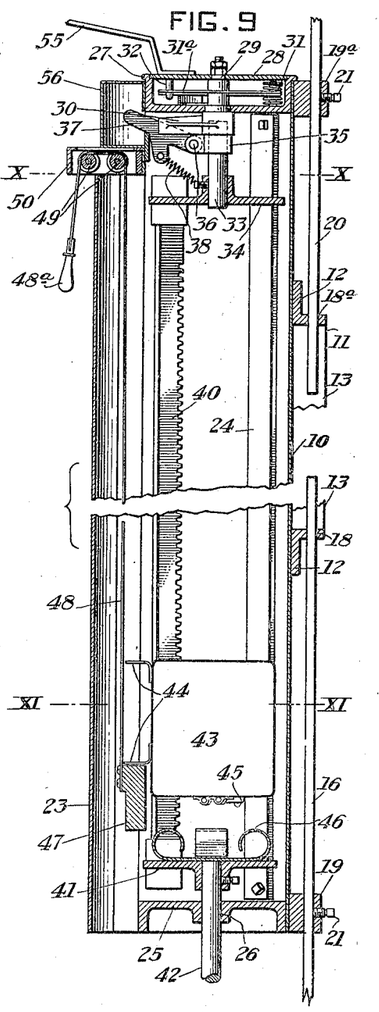
Fig. 9 is a vertical section of the entire float chamber and locking member of the gauge.
Figure 10:
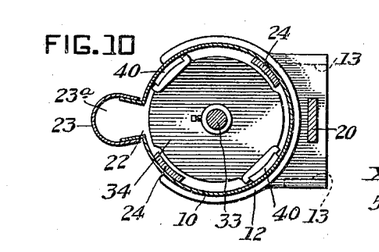
Fig. 10 is a transverse section on line X—X of Fig. 9.

Further support for the cylinder is provided by a rod 16 resting on plate 17 in the bottom of the tank and slidable through the lowermost clamping arm 12 at 18, as shown in Fig. 9, said rod also passing through a lug 19 at the bottom of the cylinder, and by means of a similar rod 20 bolted to the dome and slidably passed through lug 19a at the top of the cylinder and through the upper clamping arm 12, as indicated at 18a in Fig. 9. Set screws 21 in lugs 19 and 19a serve to adjustably clamp the cylinder to the respective rods which pass through the lugs.

The cylinder is provided with a longitudinal slot 22 along one side thereof, which is covered by a guard plate 23, the arrangement being such as to form a channel 23a. Fixed to the inside of the cylinder at diametrically opposite points and extending throughout the greater portion of the length of the cylinder, are bars 24. The bottom of the cylinder is closed by a plate 25 having a bushing or bearing 26 in the center thereof.

The top of the cylinder is closed by a cup-like member 27, in the upper face of which is a chamber, said chamber in turn being closed by a rotatable disk 28. Disk 28 is fixed to a short shaft 29 that passes through member 27 and has a socket or recess at its lower end, the lower end thereof also being provided with a radial arm 30, the construction being similar to that described in my co-pending application hereinbefore referred to.

In the chamber in the top of member 27, is a spring 31 having two arms or extensions 31a, between which projects a pin 32 on the under face of rotatable disk 28, for the purpose hereinafter described.

Fitted loosely into the socket in the lower end of shaft 29 is a second independently movable shaft 33. This shaft is secured to a rotatable plate 34 in the upper portion of the cylinder. Fixed to the shaft, between its ends, is a collar 35 in which is pivoted at 36 a latch or dog 37. A spring 38 tends to normally urge the latch downwardly. The outer end of the latch projects through a horizontal slot 39 in the upper part of the cylindrical casing. At one end of this slot is a recess 39a, into which the projecting portion of the latch or dog is forced by spring 38 when the latch is revolved to that end of the slot, as hereinafter described, to prevent further rotation of such shaft.

Connected with the plate or disk 34 at their upper ends, are diametrically opposite serrated or toothed rods 40 which are similar to bars 24. The lower ends of these rods are rigidly connected to a rotatable disk 41 near the bottom of the cylinder, just above fixed bottom plate 25. Fixed to the rotatable disk 41 is a shaft 42 which passes through bearing 26 in plate 25, and extends a considerable distance below the bottom of the cylinder. The lower end of this shaft is preferably threaded, as shown, for the purpose hereinafter described. From the foregoing, it may be seen that when shaft 33 is rotated, plate 34 will also rotate. This will move the bars 40 toward or away from bars 24, and rotate shaft 42.

The interior of the cylindrical body provides a float chamber in which is a cylindrical float 43. This float may be of any desired construction, but, as shown, is of hollow sheet metal. On the float, are one or more projecting lugs or ears 44 which extend into the slot 22 and channel 23a along one side of the cylinder. These lugs, while enabling the float to rise and lower with the contents of the tank, prevent the float from turning more than a limited distance.

Figure 11:
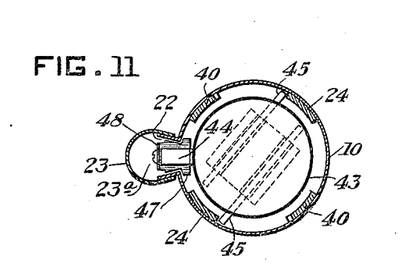
Fig. 11 is a transverse section on line XI—XI of Fig. 9, showing the float in released position.
Figure 12:
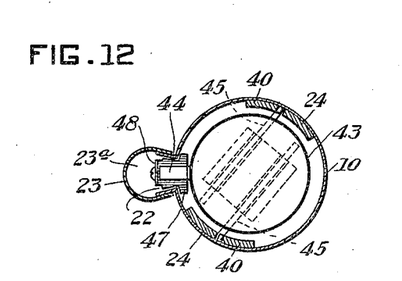
Fig. 12 is a similar view showing the parts in float locking position.

On the bottom of the float are two resilient wires 45 having projecting ends which extend beyond the periphery of the float. These wires, due to the float being unable to turn to any great extent in the float chamber, do not normally engage the teeth of either of the racks 40, as shown in Fig. 11. When shaft 33 is rotated, however, and bars 40 are moved toward bars 24, the ends of the wires are caught between the two bars and forced into the teeth of bars 40. This then locks the float at the depth of liquid in the tank, and prevents further movement thereof until bars 40 are turned back to releasing position.

On the upper face of disk 41 are leaf springs 46 for cushioning the downward movement of the float.

Figure 8:
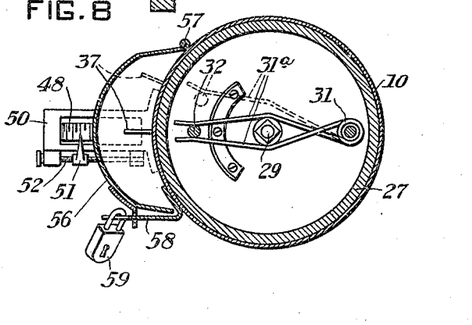
Fig. 8 is a transverse section on line VIII—VIII of Fig. 6.

Slidable in the groove 22 and channel 23a is a weight 47 which is below the lowermost lug 44 on the float. Attached to this weight, is a flexible calibrated tape 48, which extends upwardly over rollers 49 near the top of the cylindrical structure. At the free end of the tape is an operating handle 48a. The tape is visible through an opening in plate 50 which supports rollers 49, as shown in Fig. 8.

For ascertaining the height at which the float is locked in a given position, the handle 48a is pulled to raise the weight 47 until it is stopped by the float. The position of the float will be indicated by the calibrated tape, through the opening in plate 50. For the purpose of giving an exact reading, a pointer 51 is provided. This pointer may be moved by a micrometer screw 52 to provide for the necessary adjustment in measuring different fluids, as the float will sink lower in some liquids than in others, due to the difference in specific gravities of the various substances.

Secured to the rotatable disk 28 at the very top of the structure, is an arm 55. When the gauge is installed in a tank or car, the outer end of this arm is in the path of travel of the eccentric pin 9 of the dome cap 8. Consequently, when the dome cap is screwed into or unscrewed from the dome, the arm 55 is oscillated in one direction or the other.

The operation of the gauge as described so far may now be explained. When the dome cap 8 is screwed in to seal the car, after the car has been filled, it is turned in a clockwise direction. Pin 9 on the cap, while being screwed in, rocks arm 55 in a counter-clockwise direction, turning disk 28, shaft 29 and arm 30. Arm 30 is moved away from dog 37 and shaft 33 is not rotated. Spring 31 acts through pin 32 and disk 28 to return the lever 55 to its normal central position, this spring also resisting movement of the arm past central position in a clockwise direction. The float, during the time the cover or cap 8 is in position, is thus free to move to the level of the liquid in the tank.

When the cap 8 is unscrewed, pin 9 moves arm 55 in a clockwise direction. This would move disk 28, shaft 29, and arm 30 correspondingly, and arm 30, abutting against dog 37, would move the dog over to the notch 39ᵃ at one end of slot 39. When the dog is over the notch, spring 38 would rock the dog down in the notch and prevent it from moving back. Movement of the dog moves shaft 33 and disk 34, and as the dog moves into locking position, bars 40 are moved to bars 24 to lock the float. Bars 40, being fixed to disk 41, rotate this disk together with shaft 42.

A door 56 hinged at 57 covers the projecting end of the locking dog 37, and a hasp 58 and padlock 59 serve to prevent unauthorized opening of the door. Since the float can only be released by opening the door and lifting up on the end of dog 37 and turning it toward normal position, it is impossible for one not able to open the lock to alter the position at which the float is locked. The float, therefore, is effectively locked when the car is opened to indicate the depth of the contents when the car is opened.

Depending from plate 25 are posts 60 which support a bracket 61 carrying a thermometer 62 of any preferred construction, such as that shown. The thermometer includes a pointer 63 which moves across an indicating dial 64. Under the pointer and above the dial is a bridge 65 which is normally out of contact with the indicator, being urged downwardly by a spring part 66. Fixed to shaft 42 is an arm 67 having an inclined cam 68 thereon. When the float locking parts are moved to locking position, the shaft 42 rotates, causing cam 68 to engage spring part 66 to raise the bridge 65 into contact with the pointer, and thus lock the pointer against movement. It is preferred that the bridge be serrated in order to effectively hold the pointer against jarring. Thus, the temperature of the contents when the car is opened is indicated, and the indicator, like the float, locked against unauthorized tampering.

Pivoted horizontally at 70 to the base plate 17 on the bottom of the car is an open tubular casing 71, the upper end of which is supported in a bracket 72 on post 16. The bracket is so arranged as to allow the casing 71 to swing a limited distance from vertical position away from rod 16. The top of the casing is provided with diametrically opposite slots 73.

This tubular casing is designed to receive the lower end of a removable sampling device, designated generally as 75, and shown in Figs. 1, 13, 14, 15 and 16 of the drawings.

This sampling device includes a long tubular supporting casing 76 having slots 77 in its upper end and slots 77ᵃ in its lower end. The lower end of casing 76 is rigidly fitted into tube 78, which forms an extension thereof, tube 78 having slots 78ᵃ therein which register with slots 77ᵃ. The tubular extension 78 is also longitudinally slotted at 78ᵇ and its lower end is threaded at 78ᶜ. Fixed to the outside of the tubular member 78 is a pin 79, and fixed inside thereof, near its upper end, is a plug 80 (see Fig. 15). Fixed in tube 78 below slots 78ᵇ is a second plug 81. Slidable between slots 78ᵇ and between plugs 80 and 81, is a disk 82 which is urged downwardly by a compression spring 83 interposed between the disk and upper plug 80.

Fitted into the lowermost threaded end 78ᶜ of tubular member 78 is a removable plug 84 having a threaded extension 85. A sampling chamber 86 is thus formed in the lower part of tube 78. Ports 78ᵈ, which are normally open, but which are shown as closed, permit the contents of the tank to enter the chamber. Contents may be drained therefrom by unscrewing plug 84, as hereinafter described. If desired, a receptacle or test tube might be removably carried in this chamber.

Screwed onto extension 85 is a tube 87, which is provided with elongated slots 88. The lower end of the tube 87 is closed by a removable screw cap 89. At the bottom of slots 88, inside the tube 87, is a centrally apertured plug 90. A lower sampling chamber 91 is provided at the lower end of tube 87 between plug 90 and cap 89. The contents of the tank enter through the normally open port in plug 90 and may be removed by unsrewing cap 89. A test tube or other receptacle might be fitted into chamber 91.

Passing through slots 77 in the top of tube 76 is a cross bar or pin 92. Connected to this pin is a longitudinally extending operating rod 93 which connects with a cross bar 94 reciprocable vertically in registering slots 77$^a$—78$^a$. Connected to the outer projecting ends of cross bar or pin 94 are downwardly extending rods 95 which extend downwardly along the outside of tubes 78 and 87. The rods are provided with pins or studs 95$^a$ intermediate their ends.

Figure 16:
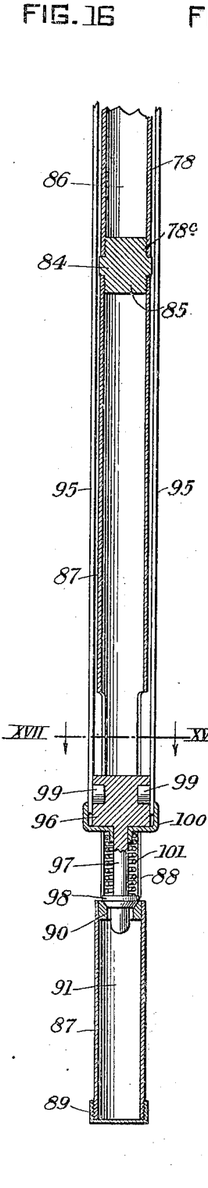
Fig. 16 is a view entirely in section of the lower end of the apparatus shown in Fig. 13.

Reciprocable in the slotted part of tube 87 above plug 90 is a plunger 96 having a vertical downward extension 97 which carries a valve 98 adapted to seat in disk 90, as shown in Fig. 16, and close the aperture therein. The plunger has diametrically opposed recesses therein which receive pins 99 on the lower ends of rods 95.

As the pins are removable in plunger 96, clamping yoke 100 is provided for normally holding the lower ends of bars 95 from springing out. This yoke is resiliently urged upwardly by spring 101 surrounding stem 97 and resting on valve 98.

Slidably fitted over the tube 78 is a sleeve 102 which is secured to rods 95 by screws or rivets 106 and 107, screws 107 also extending into plug 82.

Figures 13, 14, 17:
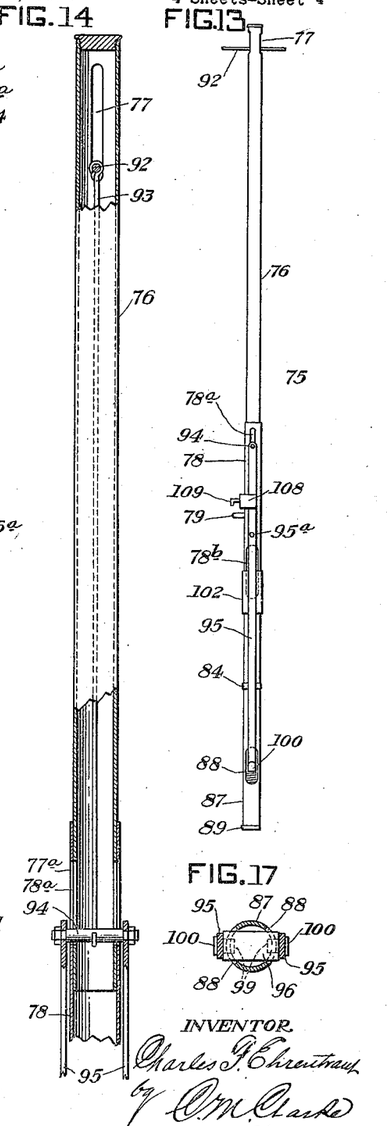
Fig. 13 is a side elevation of the removable sampling device, showing it detached from the remainder of the apparatus.
Fig. 14 is a view partly in section and partly in elevation, on a larger scale, of the upper part of that portion of the apparatus shown in Fig. 13.
Fig. 17 is a cross section on line XVII—XVII of Fig. 16.
Figure 15:
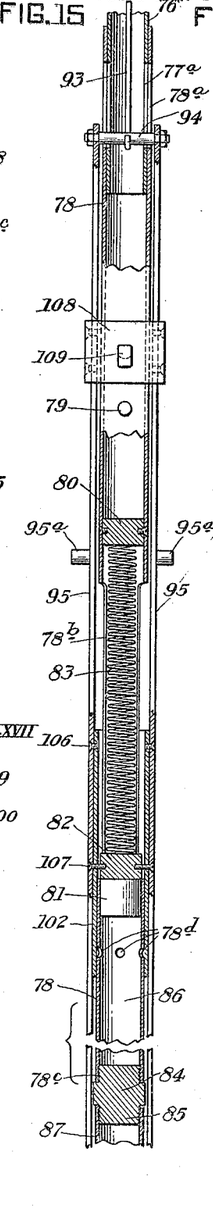
Fig. 15 is a similar view, mostly in section, of the intermediate part of such apparatus.

As shown in Figs. 14, 15 and 16, both the sampling chambers are closed. Upon raising up on cross bar 92, rods 95 may be moved upwardly, lifting block 82 to compress spring 83. Such upward movement of the rods 95 also slides sleeve 102 upwardly, to uncover ports 78$^d$, and lifts valve 98 to open the port in plug 90. Upon releasing handle 92, spring 83 acts to move the parts downwardly.

Fixed to rods 95 and embracing tube 78 above pin 79, is a collar 108 having a headed pin 109 thereon, the head of the pin being larger than the shank of the pin. This pin is in line with pin 79 on tube 78.

On the shaft 42, is a bracket 110 which is adjustable vertically on said shaft between nuts 111. This bracket carries a segmental plate 112 having two slots therein, 113 and 114. Slot 113 is in the form of an ordinary horizontal slot extending almost the length of the plate. Slot 114 is in the form of a cam, having a horizontal portion at each end, between which end portions is an inclined portion, so that one end of the slot terminates in a plane considerably above the other. The upper end of the slot has a vertical part indicated at 114$^a$ to allow for the insertion and removal of the head of pin or key 109.

In use, the device 75 is inserted into the car with the lower end thereof projecting into casing 71, which is free to move angularly on pivot 70, to allow for removal and insertion of the device. When so inserted, pins 95$^a$ engage in slots 73, and hold the device against rotation. Key 109 also catches in the open slot 114 of the cam, while pin 79 engages in slot 113. A clevis 115 having a locking or closing pin 116 on the cylindrical casing receives the upper tubular member 76 and prevents the device from swinging out of vertical position. When the car is opened, upon arrival at the destination, preparatory to removal of its contents, the float locking mechanism is operated as hereinbefore described to lock the float. This turns cam plate 112 a quarter turn, and slot 114, engaging key 109, forces the key down, closing the parts to the sampling chambers. When the key 109 is in slot 114, the head of the key acts as a hook to prevent the successful removal of the sampling device. Thus, the samples are taken from the bottom and intermediate parts of the car contents, and sealed in the respective chambers. Pin 79, engaging in slot 113, precludes possibility of pushing down on tubes 76 and 78 to open the valves, operation of the valves by lifting up on cross pin 92 being prevented by key 109 in slot 114. The tube or guard 71 prevents any one from tampering with the samples by unscrewing any of the threaded connections.

When the car is returned to the shipper, and the float released after a reading on the tape and a reading of the temperature is taken, the plate 112 is rotated by the unlocking movement of the float locking mechanism to bring portion 114$^a$ of slot 114 into register with key 109, momentarily opening the valves. By opening clevis 115, the sampling device may be pulled away from the cylindrical body 10 and lifted at the same time, and thus withdrawn from the tank. As soon as key 109 disengages the cam, spring 83 closes the valves again.

The contents of chamber 91 may be removed by removing cap 89, and the contents of chamber 86 may be removed by unscrewing plug 84, after first releasing rods 95 from engagement through pins 99 in block 96, such disengagement of rods 95 allowing tube 87 to rotate and move longitudinally.

It may thus be seen that the gauge, through the initial movement of a single lever by the unscrewing of the dome cap, locks the float in position to indicate the depth of the contents when the car was opened, locks the thermometer to register the temperature of the contents at that time, and actuates the valves of a detachable sampling tube, while at the same time locking the tube against unauthorized removal or tampering. Release can only be effected by the party who can open the door 56 and gain access to dog 37.

Through the adjustable supporting means 11—13 for the cylinder and through adjustment of rods 16 and 20, the position of the gauge in different size tanks may be changed. The threaded end of shaft 42 provides for the proper adjustment of cam plate 112 relatively to the other parts of the device when set for different tanks.

By taking a sample from the bottom of the car, the shipper may be able to verify any report as to the amount of dirt or water in any shipment, while a sample taken above the bottom will show the average or fair specific gravity for the shipment, as well as its other specifications.

The advantage of using a perforated sheet to form the float chamber cylinder resides in the fact that it enables the apparatus to be easily cleaned by steaming or other processes, and so prevent discoloration of a refined product by a gauge which had previously been immersed in crude or heavy oils.

Figure 18:
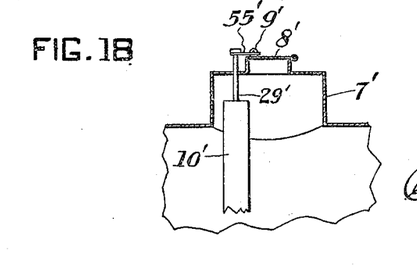
Fig. 18 is a somewhat diagrammatic view similar to Fig. 1, showing a slight modification.

The device just described is adapted for use with cars having a screw plug for closing the dome. It may be easily modified for use where a hinged cap is employed to cover the opening, as shown in Fig. 18.

In this figure, 7' represents the dome having a hinged closure 8' on which is a hasp 9'. The outage gauge, which is practically the same as that hereinbefore described, is designated 10. The actuating rod 29' corresponds to shaft 29 of the other views, but shaft 29' extends through the dome and its outer projecting end is provided with a lever 55' extending over the closure.

In use, the car is filled and sealed, a seal preferably connecting handle 55' and hasp 9'. To open the car, the seal is broken and the handle turned to one side, which moves the parts of the gauge 10' to locking position in the manner described in connection with the other figures.

Various changes and modifications may be made in the construction of the device within the contemplation of my invention and within the scope of the appended claims.

What I claim is:

1. An outage gauge comprising a float chamber, a vertically reciprocable float in the chamber, means for locking the float at any vertical position it may assume in the chamber, a detachable sampling tube, means for locking the sampling tube against removal when the float is locked, and means for preventing removal of the contents of the sampling tube when the sampling tube is locked in position.

2. An outage gauge comprising a float chamber, a vertically reciprocable float in the chamber, a locking means for the float, a sampling tube having a sample receiving chamber therein, a valve for opening and closing the sample chamber, and means operated by said float locking means for actuating the valve.

3. An outage gauge comprising a float chamber, a vertically reciprocable float in the chamber, a locking means for the float, a vertically disposed sampling tube having a plurality of sampling chambers at different heights therein, valves for opening and closing the sampling chambers, means actuated by said locking means for opening and closing the valves, and means for preventing access to said sampling chambers while said float is locked.

4. An outage gauge comprising a casing having a vertically reciprocable float therein, means for locking the float against vertical movement, a detachable sampling tube having a sample chamber therein and a valve for opening and closing the chamber, and means actuated by the float locking means for actuating said valves and for locking said sampling tube against removal while said float remains locked.

5. An outage gauge comprising a float chamber, a vertically reciprocable float in the chamber, means for locking the float at any vertical position it may assume in the chamber, a detachable sampling tube, and means for locking the sampling tube against removal when the float is locked.

6. An outage gauge comprising a casing having a vertically movable float therein, a locking means for the float, a detachable sampling tube, and a cam mechanism operated by the float locking means for locking the sampling tube against removal when the float is locked.

7. An outage gauge comprising a casing having a vertically movable float therein, a locking means for the float, a detachable sampling tube, a cam mechanism operated by the float locking means for locking the sampling tube against removal when the float is locked, and a guard into which the lower end of said tube is inserted to protect said tube when locked against removal.

8. An outage gauge comprising a casing having a vertically movable float therein, locking means for the float, a detachable sampling tube, a valve mechanism for said sampling tube, a cam operated by said float locking mechanism removably engaging the valve operating mechanism for operating the same and for preventing removal of the sampling tube when the float is locked, and means for preventing removal of the contents of the sampling tube when the sampling tube is locked in position.

9. The combination with an outage gauge having a vertically movable float, locking means for the float, and a cam actuated by the float locking means, of a sampling tube having a sample chamber and having a valve mechanism for opening and closing the sample chamber, and means engaging said cam for actuating said valve mechanism upon movement of said lock means, said cam and valve actuating means being arranged to hold the valve mechanism in open position when the float is unlocked and to move it to closed position when the float is locked.

10. The combination with an outage gauge having a vertically movable float, locking means for the float, and a cam actuated by the float locking means, of a sampling tube having a sample chamber and having a valve mechanism for opening and closing the sample chamber, means for urging the valve mechanism to closed position, and means engaging said cam for actuating said valve mechanism upon movement of said lock means, said cam and valve actuating means being arranged to hold the valve mechanism in open position when the float is unlocked and to move it to closed position when the float is locked.

11. The combination with an outage gauge having a vertically movable float, rotatable locking means for the float, and a rotatable cam actuated by the float locking means, of a sampling tube having a sample chamber and having a reciprocable valve mechanism for opening and closing the sample chamber, and means engaging said cam for actuating said valve mechanism upon movement of said lock means, said cam and valve actuating means being arranged to hold the valve mechanism in open position when the float is unlocked and to move it to closed position when the float is locked.

12. The combination with an outage gauge having a vertically movable float, a rotatable locking means for the float, and a cam rotated by the locking means, of a removable sampling device comprising a tubular body having a sample chamber therein, a reciprocable valve for opening and closing the chamber, and a valve operating mechanism being actuated by said cam, said valve operating mechanism including a pin engaging said rotatable cam and locked thereto to prevent removal of said sampling device when the float is locked and removable therefrom when the float is released to permit removal of the sampling device.

13. The combination with an outage gauge having a vertically movable float, a rotatable locking means for the float, and a cam rotated by the locking means, of a removable sampling device comprising a tubular body having a sample chamber therein, a reciprocable valve for opening and closing the chamber, and a valve operating mechanism being actuated by said cam, said valve operating mechanism including a pin engaging said rotatable cam and locked thereto to prevent removal of said sampling device when the float is locked and removable therefrom when the float is released to permit removal of the sampling device, and means for normally preventing the pin from becoming disengaged from the cam.

14. An outage gauge comprising a closely perforated casing, a float reciprocable in the casing, and rotatable means for locking the float against movement at any assumed position in the casing, the perforations in the casing facilitating cleaning thereof.

15. An outage gauge comprising a closely perforated casing, a float reciprocable in the casing, a rotatable locking means for the float, a shaft at the bottom of the casing rotated upon rotation of the locking means, a thermometer at the bottom of the casing having an indicating pointer, means movable into and out of engagement with the pointer to lock and release it, and a cam on said shaft for moving said means into pointer locking position upon the float being locked.

16. The combination with a tank, of an outage gauge supported therein and comprising a casing, a float movable vertically therein, a locking means for the float, means for actuating the locking means, a sampling tube adjustable vertically relatively to said casing, said tube having a chamber therein, a valve for opening and closing the chamber, means for operating the valve, and vertically adjustable means operated by said float locking means for actuating said valve operating mechanism concomitantly with the locking or unlocking of the float.

17. The combination with a tank car, of an outage gauge therein comprising a casing supported in the car, a float movable vertically in the casing, a locking means for the float, a shaft at the bottom of the casing actuated by said float locking means, a vertically adjustable cam on said shaft, a tubular guard member at the bottom of the tank adjustable vertically with relation to said casing, and a sampling tube removably inserted in said guard member having a valve actuating mechanism for engagement with said cam to operate the valve actuating mechanism with the float locking mechanism, the adjustment of said cam allowing for the variations in the vertical position of the sampling tube, and allowing said sampling tube to be positioned with its lower end near the bottom of the tank.

18. An outage gauge comprising a casing, a float movable vertically in the casing, locking means for the float, a rod depending from the casing and terminating in a base plate, a guard member supported on said base plate and free to oscillate relatively thereto, a sampling device removably inserted in said guard, a valve mechanism in the sampling device, and means detachably connecting the valve mechanism and float locking mechanism to operate them simultaneously.

19. An outage gauge comprising a casing, a float movable vertically in the casing, locking means for the float, a rod depending from the casing and terminating in a base plate, a guard member supported on said base plate and free to oscillate relatively thereto, a sampling device removably inserted in said guard, cooperating means on said guard and sampling device for holding the sampling device against rotation when inserted in the guard, a valve mechanism in the sampling device, and means detachably connecting the valve mechanism and float locking mechanism to operate them simultaneously.

20. The combination with a tank having an opening therein for the withdrawal of contents therefrom, of an outage gauge comprising a float chamber, a vertically movable float in said chamber, means for locking the float at any vertical position it may assume in the chamber, a detachable sampling tube, means for locking the sampling tube against removal when the float is locked, and means for preventing removal of the contents of the sampling tube when the sampling tube is locked in position, said gauge being so arranged with relation to said opening as to prevent removal of contents through the opening prior to the actuation of said locking means.

21. The combination with a tank having an opening therein for the withdrawal of contents therefrom, a closure for said opening, of an outage gauge comprising a float chamber, a vertically reciprocable float in the chamber, a locking means for the float including a lock actuating member, a sampling tube having a sample receiving chamber therein, a valve for opening and closing the sample chamber, and means operated by said float locking means for locking the valve, said lock actuating member being so disposed with relation to said closure as to necessitate actuation of said member before the closure may be opened.

In testimony whereof I hereunto affix my signature.

CHARLES F. EHRENTRAUT.